United States Patent
Boiger et al.

(10) Patent No.: US 11,153,936 B2
(45) Date of Patent: Oct. 19, 2021

(54) CERAMIC HEATING RESISTOR, ELECTRICAL HEATING ELEMENT, AND DEVICE FOR HEATING A FLUID

(71) Applicant: Leister Technologies AG, Kägiswil (CH)

(72) Inventors: Gernot Boiger, Winterthur (CH);
Marlon Boldrini, Winterthur (CH);
Michal Gorbar, Dübendorf (CH);
Yoram De Hazan, Uster (CH);
Thomas Hocker, Winterthur (CH);
Pascal Horat-Fässler, Lucerne (CH);
Stéphane Mauchle, Winterthur (CH);
Dirk Penner, Zürich (CH); Bruno Von Wyl, Kägiswil (CH)

(73) Assignee: Leister Technologies AG, Kägiswil (CH)

( * ) Notice: Subject to any disclaimer, the term of this patent is extended or adjusted under 35 U.S.C. 154(b) by 0 days.

(21) Appl. No.: 17/269,735

(22) PCT Filed: Feb. 28, 2019

(86) PCT No.: PCT/EP2019/055051
§ 371 (c)(1),
(2) Date: Feb. 19, 2021

(87) PCT Pub. No.: WO2019/185291
PCT Pub. Date: Oct. 3, 2019

(65) Prior Publication Data
US 2021/0243849 A1    Aug. 5, 2021

(30) Foreign Application Priority Data
Mar. 26, 2018   (EP) .................................... 18163884

(51) Int. Cl.
*H01C 3/14*   (2006.01)
*H01C 3/16*   (2006.01)
(Continued)

(52) U.S. Cl.
CPC ............. *H05B 3/148* (2013.01); *C04B 35/18* (2013.01); *H01C 3/14* (2013.01); *H01C 3/16* (2013.01);
(Continued)

(58) Field of Classification Search
None
See application file for complete search history.

(56) References Cited

U.S. PATENT DOCUMENTS 3,269,806 A    8/1966  Fitzer
3,816,706 A *  6/1974  Meywald ............... A45D 20/08
                                              219/537
(Continued)

FOREIGN PATENT DOCUMENTS

DE    1243078 B    6/1967
DE    2349743 A    4/1974
(Continued)

OTHER PUBLICATIONS

International Search Report for corresponding Application No. PCT/EP2019/055051, dated Jun. 12, 2019.
(Continued)

*Primary Examiner* — Joseph M. Pelham
(74) *Attorney, Agent, or Firm* — Renner, Otto, Boisselle & Sklar, LLP

(57) ABSTRACT

A ceramic heating resistor to be arranged in a tubular element of an electrical heating element for heating a fluid, preferably air, wherein the heating resistor can be produced by sintering a green body comprising at least one ceramic raw material. The heating resistor includes an electrically
(Continued)

insulating component and an electrically conducting component, and the electrically insulating component forms a matrix in which the electrically conducting component is accommodated. An electrical heating element for heating a fluid, preferably air, including at least one tubular element, through which a fluid flows or can flow, and to a device for heating a fluid, preferably air, including at least one such heating element.

13 Claims, 10 Drawing Sheets

(51) Int. Cl.
    *H05B 3/14* (2006.01)
    *H05B 3/42* (2006.01)
    *C04B 35/18* (2006.01)
    *H05B 3/18* (2006.01)
    *H05B 3/24* (2006.01)

(52) U.S. Cl.
    CPC ............... *H05B 3/18* (2013.01); *H05B 3/24* (2013.01); *H05B 3/42* (2013.01); *H05B 3/141* (2013.01); *H05B 2203/002* (2013.01); *H05B 2203/018* (2013.01); *H05B 2203/021* (2013.01)

(56) References Cited

U.S. PATENT DOCUMENTS

| | | | | |
|---|---|---|---|---|
| 3,859,500 | A * | 1/1975 | Matys | H05B 3/148 219/553 |
| 4,038,628 | A * | 7/1977 | Salemi | H01C 3/16 338/318 |
| 4,862,137 | A | 8/1989 | Javme | |
| 6,456,785 | B1 * | 9/2002 | Evans | F24H 1/102 392/448 |
| 2005/0184058 | A1 | 8/2005 | Sundberg | |
| 2013/0313246 | A1 * | 11/2013 | Long | H01C 3/08 219/544 |
| 2014/0238974 | A1 * | 8/2014 | Nauditt | H01C 17/30 219/534 |
| 2017/0268801 | A1 | 9/2017 | Ikesaki | |
| 2020/0253001 | A1 * | 8/2020 | Nauditt | B33Y 80/00 |

FOREIGN PATENT DOCUMENTS

| | | |
|---|---|---|
| EP | 0168187 A1 | 1/1986 |
| EP | 1947908 A1 | 7/2008 |
| EP | 2921469 A1 | 9/2015 |

OTHER PUBLICATIONS

International Preliminary Report on Patentability for corresponding Application No. PCT/EP2019/055051, completed on Aug. 7, 2020.

* cited by examiner

CERAMIC HEATING RESISTOR, ELECTRICAL HEATING ELEMENT, AND DEVICE FOR HEATING A FLUID

TECHNICAL FIELD OF THE INVENTION

The invention relates to a ceramic heating resistor to be disposed in a tubular element of an electrical heating element for heating a fluid, preferably air, wherein the heating resistor can be produced by sintering a green body comprising at least one ceramic raw material, the heating resistor comprises an electrically insulating component and an electrically conducting component, and the electrically insulating component forms a matrix in which the electrically conducting component is accommodated. As a result, this is a composite material made of metallic and mineral components.

A heating resistor in the present connection shall be understood to mean the part of an electrical heating element that actively generates and gives off heat when current is flowing.

The invention additionally relates to an electrical heating element for heating a fluid, preferably air, which comprises at least one tubular element, through which a fluid flows, and a ceramic heating resistor, which is disposed, or can be disposed, in the tubular element. The invention furthermore relates to a device for heating a fluid, preferably air, comprising such a heating element.

DESCRIPTION OF THE RELATED ART

Unexamined patent application DE 2349743 A describes an electrical resistor element for high temperatures, comprising an incandescent region formed by a conducting ribbon having the shape of a helix, and a pair of connecting conductors connected to this region. The resistor element is essentially composed of a thin tube having a circular cross-section, having an outer wall that is at least partially slotted by a helical cut-out, wherein the central tube axis is also the screw axis of the helical cut-out(s). The resistor element has a tubular, porous skeleton made of silicon carbide, into which a poorly meltable, metallically conducting additive, such as molybdenum silicide, has seeped so as to completely fill all the cavities of the skeleton. The tubular resistance element can thus be produced with very thin walls so as to allow a larger amount of energy to be given off at the surface thereof, while offering improved mechanical strength and a positive temperature coefficient for the electrical resistor.

The disadvantage of the above-described resistor element is the small size, compared to the overall dimensions thereof, of the effective surface of a tubular body for a thermal energy transfer to a medium surrounding and/or both flowing through and flowing around the resistor element, such as a liquid or a gas. In the process, it is already assumed that a fluid to be heated by way of the resistor element flows around the resistance element to begin with. In addition, it must then essentially be assumed that a preferred flow direction of the fluid exists parallel to the central axis, which is to say the axis of symmetry of the tube of which the resistor element essentially consists. Furthermore, the cross-section of the fluid flow may be only insignificantly larger than the cross-section of the resistance element, since otherwise no effective thermal energy transfer to the portion of the fluid flow flowing around (and not flowing through) the tube can take place. Since the tubular resistor element is to only have a low material thickness, which is to say a low thickness of the tube wall, the effective surface for the thermal energy transfer is also only increased insignificantly by the helical cut-out or cut-outs in the tube wall.

In addition, electrical heating elements or heating resistors for heating a fluid, made of silicon carbide ceramic or other ceramics, are known in general from the prior art, however silicon carbide ceramics are relatively expensive to produce due to the required high sintering temperatures, and are therefore not economical, in particular for heating elements in this field. It is thus customary to thread in helical heating wires in heating elements in the form of single-hole tubes or multi-hole tubes, through which a fluid flows, and connect these electrically in series. The ceramic tube serves as an electrical and thermal insulator in the process. The heating coils have to be threaded manually into the tube in a complex process. These designs are additionally prone to soiling and, due in no small part to wear of the heating coils as a result of the thermal load, combined with the soiling problem, have to be replaced on a regular basis. Devices for heating a fluid based on such heating elements or heating resistors are therefore maintenance-intensive.

Proceeding from the problems that arise from the described prior art, it is the object of the present invention to provide a compact heating resistor for an electrical heating element for heating a fluid, which enables efficient heat transfer to a fluid to be heated, while heating the heating resistor itself as little as possible, considerably reduces the need for maintenance, and is easy and cost-effective to produce.

SUMMARY OF THE INVENTION

Accordingly, a ceramic heating resistor according to the invention comprises at least one helicoid body having a central screw axis, wherein the fluid flows around the heating resistor with a preferred flow direction parallel to the screw axis of the helicoid body. A helicoid body results from a planar surface being twisted along a screw line in the Euclidian space about a central screw axis, wherein the surface is disposed in a plane with the screw axis and a further axis orthogonal to the screw axis at a starting point of the torsion. Such a screw line is also referred to as a helix. The surface abuts the screw axis with at least one point on a curve that at least partially traces the surface, or a non-vanishing radial minimum distance exists between the screw axis and at least one point on a curve that at least partially traces the surface. The parameters of the screw line as well as those of the surface can change continuously or discontinuously over the course of the torsion between a starting point and an end point of the torsion. In the process, for example the radial distance between the points of the screw line and the screw axis can change, or the slope of the curve, which is to say the number of turns of the screw line based on a standard unit of length along the screw axis. With respect to the surface, for example, the shape and the size of the surface can vary. In this way, a multitude of variants of helicoid bodies which are adapted to the respective application requirements can be implemented.

A heating resistor according to the invention is provided for use in a heating element for heating a fluid, comprising at least one tubular element in which the heating resistor is disposed, so that the fluid to be heated flows around the helicoid body with a preferred flow direction parallel to the screw axis of the helicoid body. For this purpose, it is provided that the cross-sectional surface of the tubular element of the heating element, in terms of the shape and size thereof, is configured such that the cross-sectional surface of the tubular element is only insignificantly larger than the maximum cross-sectional surface of the heating resistor. The cross-sectional surface of the tubular element should therefore only be larger insofar as this makes it easier to insert the heating resistor into the tubular element, and the thermal expansion of the heating resistor during operation does not result in direct contact between the heating resistor and the tubular element, wherein furthermore the manufacturing tolerances of the heating resistor and the tubular element should also be taken into consideration. Overall, this causes a fluid flowing around the heating resistor to be forced to follow a helical path predefined by the helicoid body of the heating resistor, except in the negligible edge regions in the immediate vicinity of the inner wall of the tubular element. In this way, the heat transfer from the heating resistor to the fluid is optimized. Compared to the heating resistors known from the prior art, a heating resistor according to the invention, at the same heat transfer performance to a fluid flowing around the heating resistor, can be operated at lower temperatures and/or a heating resistor according to the invention can be designed to be more compact (shorter), in particular with respect to the extension thereof along the screw axis as the preferred longitudinal axis. The resulting flow direction of the fluid is, of course, parallel to the central axis of the tubular element, wherein the screw axis of the heating resistor preferably coincides with the central axis of the tubular element. The inside wall of the tubular element can additionally be designed to correspond, at least in sections, to an enveloping outer contour of the heating resistor, in particular of the helicoid body or bodies of the heating resistor, so as to reduce the radial distance and the cross-sectional surface between the enveloping outer contour and the inside wall of the tube, as well as the fluid flow in the region, to an absolute minimum (manufacturing tolerances, thermal expansion).

As was already indicated, further optimizations can result, for example, from the distance of the helices, and the (local) axial and/or (local) radial thickness thereof. A helix shall be understood to mean a sub-segment of a helicoid body, which winds only once about the screw axis. The (local) radial thickness results from the difference between the (local) maximum radial distance and the (local) minimum radial distance of a helicoid body with respect to the screw axis. The (local) axial thickness is the local thickness or material thickness of a helicoid body in the axial direction, which is to say parallel to the screw axis thereof.

For the electrical contacting of a heating resistor according to the invention, the heating resistor preferably comprises at least two separate connecting electrodes. In the case of a heating resistor that essentially consists of only one helicoid body, it is provided that such a connecting electrode is disposed at an integral molding or the like at the beginning or the end at the beginning or the end of the screw line. At least one means for fixation to a heating element can also be provided at the heating resistor, wherein, in the case of a heating resistor that essentially consists of only one helicoid body, such fixing means are preferably disposed in the region of the starting point or the end point of the screw line. If connecting electrodes are also disposed in the aforementioned regions, it is particularly preferred for the fixing means to be disposed at the connecting electrode via which electrical current is introduced into the heating resistor. A heating resistor according to the invention can comprise an arrangement of multiple helicoid bodies, which can, for example, be disposed in series or parallel to one another, or also can be helically wound inside one another, or any arbitrary combination thereof. In particular in the event that two or more helicoid bodies are helically wound inside one another, a contactless arrangement of the helicoid bodies with respect to one another is preferred. A connection of the helicoid bodies among one another does not preclude this, provided the connection is established outside the actual helicoid body, which is say, for example, at an integral molding or an extension of the respective helicoid body at a starting point or an end point of the respective screw line.

In a preferred variant embodiment, a heating resistor according to the invention comprises an arrangement of at least two helicoid bodies having parallel screw axes, wherein the helicoid bodies are helically wound inside one another in a contactless manner. An arrangement of two or, generally speaking, of an even number of helicoid bodies is particularly preferred. The screw axes of the at least two helicoid bodies are parallel, but do not necessarily have to coincide; the screw axes can thus also be spaced apart in the radial direction. For the helicoid bodies to be helically wound inside one another in a contactless manner, at least the helical lines are twisted with respect to one another by an angle in a perpendicular to the screw axes, and the helicoid bodies are implemented as hollow bodies, at least in a certain radial surrounding area about the screw axes. The precise configuration can be determined by a person skilled in the art, depending on the usage purpose of the heating element according to the invention, for example as a function of the radial extension of the helicoid bodies as a whole, as well as the (local) axial thickness of the helices and the (local) axial thickness of the helices of the helicoid bodies. It is provided that at least the lead of the respective screw line of the helicoid bodies is (locally) identical so as to avoid the helicoid bodies intersecting. Additionally, however, helicoid bodies helically wound inside one another do not necessarily have to be identically configured.

In a particularly preferred variant embodiment of a heating resistor according to the invention, it is provided that the helicoid bodies are connected to one another in an electrically conducting manner in the region of one end of the helicoid arrangement, and are designed as separate connecting electrodes at an opposing further end of the helicoid arrangement. In addition, electrical current can be conducted into the heating resistor via one of the connecting electrodes, wherein the current then initially flows through the associated helicoid body, and subsequently via the connection of the helicoid bodies at the other end of the helicoid arrangement into a further helicoid body, via the connecting electrode of which the current flow is discharged again. In a preferred arrangement of two or, generally speaking, an even number of helicoid bodies, it is preferred that two of the helicoid bodies at a time are connected to one another in an electrically conducting manner, wherein helicoid bodies connected in an electrically conducting manner in pairs are particularly preferably only connected in an electrically non-conducting (purely mechanical) manner to further helicoid bodies connected to one another in an electrically conducting manner, in pairs. One or more such non-conducting connections can be present in arbitrary locations between helicoid bodies that are connected in an electrically conducting manner, in pairs or, generally speaking, between helicoid bodies that are connected in an electrically conducting manner or non-electrically conducting manner.

It is provided, by appropriately selecting the material and configuring the arrangement of helicoid bodies, for example with respect to the lead of the screw lines as well as the radial and axial thickness of the helices of the helicoid bodies, which may be variable, to design the heating resistor so as to have the lowest temperatures of the entire heating element in the region of the connecting electrodes, during operation, in order to decrease the problematic thermal load of the connecting electrodes and improve the service life of the heating elements. The temperature of the heating resistor is preferably the greatest in the sub-region or sub-regions of the heating resistor abutting the electrically conducting connecting region or regions of the helicoid bodies of the heating resistor. At least one of the connecting electrodes can be configured so as to comprise means for fixation to a heating element, which optionally comprises fixing means corresponding thereto for establishing a (detachable) connection. If none of the connecting electrodes comprises fixing means, it is provided that such fixing means, which are possibly provided, are at least disposed in the sub-region of the heating resistor around the connecting electrodes, so as to minimize, in particular, the thermal load of the fixing means.

According to a further preferred variant embodiment of a heating resistor according to the invention, at least one helicoid body is designed as an open helicoid body. An open helicoid body does not include the screw axis. This means that an open helicoid body, by definition, is implemented so as to be completely hollow in a certain radial surrounding area around the screw axis. This is particularly relevant in the case of a heating resistor comprising an arrangement of multiple helicoid bodies helically wound inside one another, in which electrically conducting contact is to be limited to the electrically conducting connecting region or regions.

In an additional preferred variant embodiment of a heating resistor according to the invention, an electrically insulating tube made of a ceramic material is disposed in the central cavity of an open helicoid body. The tube can, for example, be designed to accommodate a measuring probe, and in particular a thermometer. As an alternative, the electrically insulating tube can, for example, also be configured as a support and/or as part of a fixation of the heating element, wherein it can then also be designed as a solid rod or, in segments, in a tubular as well as rod-shaped manner.

According to another preferred variant embodiment of a heating resistor according to the invention, the ratio of the radial helix thickness to the axial helix width of at least one helicoid body is at least 2:1.

In another preferred variant embodiment of a heating resistor according to the invention, the ratio of the inside diameter to the outside diameter of at least one helicoid body is a maximum of 0.5 (1:2).

It is provided in the process that the axial helix width can additionally be variable, and more particularly both in the radial direction, for example increasing from a smaller to a larger radius about the screw axis, and in the axial direction along the screw axis, for example decreasing from the starting point of the screw line of a helicoid body toward the end point thereof. In terms of an axial helix width that is variable in the radial direction, the aforementioned radially increasing axial helix width is preferred. Another design option of a heating resistor according to the invention then results from the fact that at least one helicoid body of the heating resistor, along the screw axis thereof, can have a variable distance between adjoining turns, which is to say the lead of the associated screw line is variable. In particular in the case of a heating resistor comprising an arrangement of helicoid bodies that are helically wound inside one another, an increase in the distance between adjoining helices, from one end of the arrangement in the region of the connecting electrodes to the other end including the connecting region of the helicoid bodies, is particularly preferred.

It is provided, in a heating resistor according to the invention, that the electrically conducting component is at least partially formed of a metal alloy of the silicide type, and in particular molybdenum disilicide. Silicides are binary metallic compounds of silicon, and are usually considered to be intermetallic compounds. These are typically electrically conductive, have a metallic luster, and crystallize in defined structures. Silicides of many metals are known but aluminum, antimony, arsenic, bismuth, cadmium, mercury, silver, thorium, and zinc do not form silicides. The known metal silicides also include molybdenum disilicide.

It is furthermore provided that the electrically insulating component of the heating resistor according to the invention is formed of a mineral of the silicate type, preferably feldspar, of a ceramic of the oxide type, preferably aluminum oxide, or an arbitrary combination thereof. Natural silicate minerals play a major role in mineralogy. More than 90% of the Earth's crust is made up of silicates, and the mantle almost entirely consists of silicates. Other important rock-forming minerals include micas, clay minerals, amphiboles, spars and the like. Silicate minerals are typically insulators. They are accordingly inexpensive. Oxide ceramics are typically likewise insulators and have higher strengths compared to silicate ceramics, in particular at elevated temperatures.

Such a heating resistor according to the invention is typically produced by sintering a green body, which is created by way of pressing, casting, injection molding and/or extrusion, or other suitable ceramic shaping methods of a substance mixture that comprises the electrically conducting component of the silicide type and the electrically insulating component of the silicate and/or oxide type. The green body thus created can then, optionally, be mechanically worked and coated once or multiple times, and finally be sintered so as to take on the final shape thereof.

The electrical conductivity of the sintered ceramic heating resistor is dependent on the geometry thereof, and thus on that of the green body. It is additionally dependent on the mixing ratio of the electrically conducting component of the silicide type and the electrically insulating component of the silicate and/or oxide type of the substance mixture used for shaping. The resistivity of the heating resistor can be varied within a wide range by specifically setting the mixing ratio, and the conductivity can thus be adapted to the usage purpose of the ceramic heating resistor and the conditions that are predefined in this regard. The resistance of the heating resistor can, of course, also be influenced by varying the geometry of the green body. However, the geometry of the heating resistor, which is dependent on that of the green body, is frequently predefined by the use of the heating resistor and the conditions present there, and can thus frequently only be varied within a small range.

Precisely this combination of an electrically conducting component of the silicide type and an electrically insulating component of the silicate and/or oxide type has proven to be particularly suitable in the required temperature range, in particular for the use in a heating resistor according to the invention in an air heater, with respect to the production, the operating behavior and the required variation options. Even though composite materials made of at least two components are known, one of which is formed of an electrically conducting component of a metal alloy of the silicide type and the other is formed of an electrically insulating component of a mineral of the silicate type and/or of a ceramic of the oxide type, the use of these is established essentially in the field of high temperature furnace technology.

A ceramic heating resistor according to the invention preferably comprises a feldspar-molybdenum disilicide composite material, wherein the composite material, in a particularly preferred variant embodiment, can additionally comprise a further component made of aluminum oxide. Molybdenum disilicide, or $MoSi_2$, is resistant to high temperatures and has a high melting point, high oxidation resistance, and high conductivity. Compared to other ceramic materials, it is characterized by lower sintering temperatures. As a result, the proposed electrical heating resistor is particularly inexpensive and easy to produce. Feldspar is cost-effective and has a relatively low melting point. This helps during the sintering process and reduces the porosity. Feldspar and molybdenum disilicide have similar coefficients of thermal expansion, and thus make a functioning composite possible, at the usual operating temperatures of the heating resistor, and also during temperature fluctuations. The vitrification of feldspar onsetting during sintering to form the final product envelopes the molybdenum disilicide particles, effectively protecting these against oxidation. The use of feldspar in this composite material counteracts molybdenum disilicide pest, which is known to occur with molybdenum disilicide.

Molybdenum disilicide, $MoSi_2$, is an intermetallic chemical compound of molybdenum from the group of the silicides. In addition, with $Mo_3Si$ and $Mo_5Si_3$ further molybdenum silicides are known. Molybdenum disilicide is resistant against acids, dilute lyes, saline solutions as well as various salt melts. In addition, it distinguishes itself from other metals and alloys by high corrosion resistance against reducing gases as well as oxidizing gases at high temperatures.

At 50 to 60 volume percent, feldspars are the most frequently occurring silicates in the Earth's crust. Feldspar denotes a large group having the general chemical composition $(Ba,Ca,Na,K,NH_4)(Al,B,Si)_4O_8$. The elements indicated in parentheses can each represent one another, but always have the same quantity ratios with respect to the other constituents of the mineral (substitution). Feldspars crystallize either in the monoclinic or the triclinic crystal system, and the melting temperature range is approximately 1150 to 1250° C. Feldspathoids (foids) related to the feldspars, and additionally other substances forming silicate glass, can likewise be used for the insulating component in the composite material of a heating resistor according to the invention.

Aluminum oxide has a higher melting temperature compared to feldspars and thus improves the strength of the ceramic heating resistor according to the invention, in particular at elevated temperatures, by having a supporting effect on the material structure of a feldspar-molybdenum disilicide-aluminum oxide composite material.

A ceramic heating resistor according to the invention can comprise a heating region and at least one electrically conducting contacting region, which is designed to have higher electrical conductivity compared to the heating region. The contacting region is provided for attaching and electrically connecting connecting electrodes, by way of which a voltage can be applied to the heating region so as to achieve heating of the heating resistor, and in particular of the heating region. The contacting region thus advantageously extends at least partially between the connecting electrodes and the heating region. In the process, the heating region is considered to be, above all, the sub-region or sub-regions of a heating resistor according to the invention designed as helicoid bodies. Contacting regions are preferably disposed outside the regions of the heating resistor designed as helicoid bodies, for example in the region of integral moldings or extensions in the region of the starting point and/or end point of the screw line of a helicoid body. The contacting region can adjoin the heating region in the direction of current flow, or extend at least partially across or around at least a limited portion of the heating region, including transversely to the direction of current flow. The content of the electrically conducting metal alloy is greater in the contacting region than in the heating region, so that the contacting region has lower resistivity or higher conductivity compared to the heating region, and is thus heated less strongly than the actual heating region. The content of the metal alloy in the contacting region is preferably at least 1.2 times higher than in the heating region.

In addition, a ceramic heating resistor according to the invention can comprise at least one electrically insulating insulation region, which is designed to have a lower electrical conductivity than the heating region and/or the contacting region, in that the content of the electrically conducting metal alloy is lower than in the heating region and/or the contacting region. The insulation region can be disposed as an insulating layer between the contacting region and the heating region when the contacting region partially extends around or across the heating region of the heating resistor in the direction of current flow. Due to the lower material content of electrically conducting metal alloy in the insulation region compared to the heating region or the contacting region, this has a high resistivity compared to the heating region or the contacting region, so that undesirable current flow can be reliably prevented and/or current flow is only permitted in a direction through the heating resistor which is predefined by the arrangement, and/or through the electrical heating element comprising the heating resistor.

It is provided in the ceramic heating resistor according to the invention that the respective contacting region or regions and/or the respective insulation region or regions are applied as coatings onto an outer section of the heating region, and/or the insulation region is applied as a coating onto an outer section of the heating region, and the contacting region is applied as a coating onto a section of the insulation region and the heating region. The outer section of the heating region shall be understood to mean a section of a heating resistor according to the invention which is designed as a heating region, however which is not a section of the heating resistor which is implemented as a helicoid body, but preferably adjoins, in the form of in integral molding or extension, a section implemented as a helicoid body. In this way, arbitrary combinations of the contacting region and of the insulation region can be implemented with one another and with the heating region. In particular, an arbitrary number of insulation regions or contacting regions is thus possible on an outer section of a heating region. In the process, the corresponding coatings can, depending on need, serially adjoin one another and/or be disposed on top of one another with partial and/or full overlap. In this way, the at least one insulation or contacting region, and preferably several such regions, can be particularly expediently disposed on an outer section of a heating region so as to ensure an optimal direction of current flow, and to be able to attach the current-carrying connecting electrodes in a suitable location of the heating resistor. According to another embodiment of the heating resistor according to the invention, the heating region is, at least in portions, or completely, provided with at least one insulating coating. It is thus possible to provide the entire helicoid body (except for a small contacting region) with a thin, electrically insulating coating, so as to electrically insulate the heating resistor with respect to the outside.

The provided coatings can already have been applied to the green body, so that, in one step by sintering of the green body, the heating region, together with the at least one contacting region and, possibly, with the at least one insulation region, becomes a finished ceramic heating resistor, in which the coatings are integrally joined among one another. As an alternative, the coatings can also be subsequently applied to an already sintered green body, which is to say to a ceramic heating resistor that has already been created and includes only the heating region. The second procedure is more complex than the first, since at least one further sintering process is required.

Sintering is a method for producing or changing materials in which granular ceramic or metallic substances are heated, often under increased pressure, but with the temperatures remaining below the melting temperatures of the components, so that the shape of the workpiece, which is to say of the green body, is preserved. In general, shrinkage arises in the process, since the particles of the starting material become compacted, and porosities are filled. Sintering process are of great importance during the production of ceramics, as well as in metallurgy. As a result of the heat treatment during sintering, a solid workpiece is obtained from fine-grained or coarse-grained, or fine-pored or coarse-pored, green body produced in a preceding process step. The sintered product is only given the final properties thereof, such as hardness, strength or temperature conductivity, which are necessary in the particular use, as a result of the heat treatment, such that multiple-sintering can result in changes in the ceramic heating resistor.

In the process, the content of the electrically conducting component, and in particular of the preferred molybdenum disilicide, in the heating resistor according to the invention is preferably 20 to 60 percent by weight and/or 10 to 30 percent by volume, and preferably 25 to 30 percent by weight or 12 to 15 percent by volume. Accordingly, the content of the electrically insulating component is preferably 80 to 40 percent by weight and/or 90 to 70 percent by volume, and preferably 75 to 70 percent by weight or 88 to 85 percent by volume. The insulating component is preferably composed of a mixture of feldspar, feldspathoids or other substances forming silicate glass, and aluminum oxide, wherein the content of aluminum oxide in the heating resistor according to the invention is preferably 20 to 30 percent by volume, and the content of feldspar is 50 to 70 percent by volume. These values may be influenced by impurities that are present. By modifying the mixing ratio of the content of the electrically conducting component, or of the molybdenum disilicide, and of the content of the electrically insulating component, it is advantageously possible to arbitrarily set the resistivity, which is to say the conductivity of the heating region, of the contacting region and/or of the insulation region in a wide range, so as to ideally match the ceramic heating resistor, or the electrical heating element, to the respective application.

In an electrical heating element according to the invention for heating a fluid, preferably air, comprising at least one tubular element through which a fluid flows or can flow, a ceramic heating element according to any one of the above-described variant embodiments according to the invention is disposed in the tubular element in such a way that the screw axis or axes of the helicoid bodies of the heating element is or are oriented substantially parallel to the central axis of the tubular element, and the fluid flows across the helicoids of the helicoid body or bodies.

A device according to the invention for heating a fluid, preferably air, comprises at least one electrical heating element according to the invention described in the section above. In particular, this is a device according to the invention for heating a fluid, preferably a device for warming or heating an air flow in an air heater for drying or heating objects or, among other things, also for use in the plasticization of plastic materials, such as corresponding hot air blowers or automatic welding machines, for example.

Compared to a standard heating element, the invention has the advantage that the production process can be automated to a greater degree than in the past, which, in turn, results in lower production costs. Further advantages include a longer service life and a higher achievable temperature of the heated fluid and/or a shorter design of the heating element, as a result of a higher operating temperature of the heating element, or improved heat transfer between the heating resistor and the fluid, due to a larger heat transfer surface as well as the ease of varying the electrical and/or thermal properties. The heating element is essentially formed by the heating resistor, which represents a considerable simplification over the prior art comprising the inserted electrical resistance wires. The ceramic part is additionally electrically conducting.

The features and feature combinations mentioned above in the description, and the features and feature combinations mentioned hereafter in the description of the figures, and/or shown only in the figures, can be used not only in the respective indicated combinations, but also in other combinations, or alone. It is not necessary for all the features of the claims to be implemented to carry out the invention. It is also possible to replace individual features of the claims with other disclosed features or feature combinations.

BRIEF DESCRIPTION OF THE DRAWINGS

Further advantages, features and details of the invention will be apparent from the claims and the following description of preferred embodiments based on the drawings, in which identical or functionally equivalent elements are denoted by identical reference numerals. In the drawings:

DETAILED DESCRIPTION OF THE INVENTION

Figure 1:
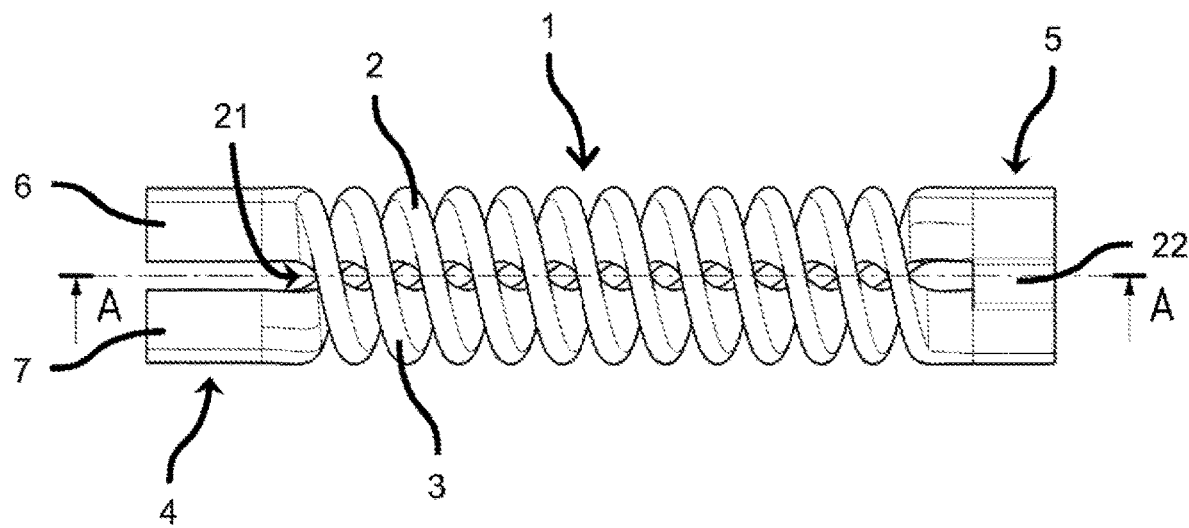
FIG. 1 shows a schematic illustration of a heating resistor according to the invention in a side view.

The illustration of FIG. 1 shows an exemplary embodiment of a heating resistor 1 according to the invention. The heating resistor 1 is essentially formed of an arrangement of a first helicoid body 2 and a second helicoid body 3, which are helically wound inside one another in a contactless manner, and the screw axes of which coincide. The arrangement of the two helicoid bodies thus corresponds to a type-1 double helix, which is also referred to as a double-threaded screw. The shared screw axis of the helicoid bodies 2, 3 also forms the preferred longitudinal axis of the heating resistor 1. The helicoid bodies 2, 3 have an identical design, however are twisted with respect to one another by an angle an angle in a plane perpendicular to the screw axis, so that the two helicoid bodies 2, 3 extend around one another in a contactless manner. For this reason, the center of the arrangement of the two helicoid bodies 2, 3 is hollow, which is resulting from configuring the two helicoid bodies 2, 3 as open helicoid bodies. The central cavity 21 is cylindrical, the cylinder axis of symmetry corresponding to the shared screw axis of the two helicoid bodies 2, 3. At the two longitudinal-side ends 4, 5 of the arrangement of the two helicoid bodies 2, 3, these are each continued parallel to one another by integral moldings along the shared screw axis. On one longitudinal side of the arrangement of the two helicoid bodies 2, 3, the respective integral moldings at the helicoid bodies 2, 3 are connected to one another in an electrically conducting manner in a connecting region 22. At the longitudinal-side end 4 of the arrangement of the two helicoid bodies 2, 3 which is located opposite the connecting region 22, the respective integral moldings are implemented as separate connecting electrodes 6, 7, wherein the connecting electrode 6 belongs to the first helicoid body 2, and the connecting electrode 7 belongs to the second helicoid body 3.

Figure 2:
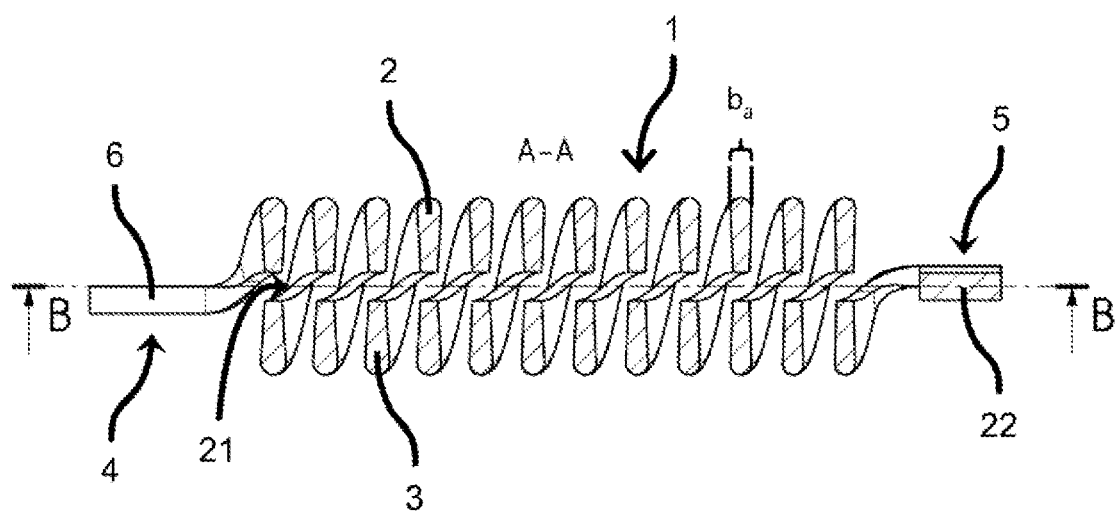
FIG. 2 shows a sectional view of the heating resistor of FIG. 1 along line A-A from FIG. 1.
Figure 3:
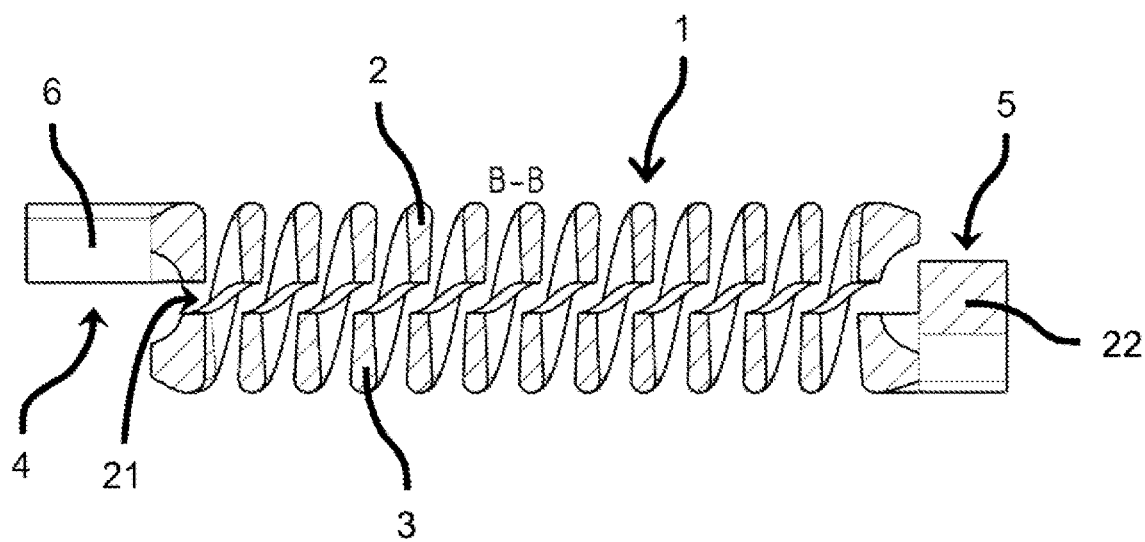
FIG. 3 shows a sectional view of the heating resistor of FIG. 1 along line B-B from FIG. 2.

FIG. 2 shows the heating resistor 1 as a sectional image along line A-A of FIG. 1, and FIG. 3 shows this as a sectional image along line B-B of FIG. 2. In the illustrated exemplary embodiment, the inner radius r as well as the outer radius R and the radial thickness $d_r=R-r$ of the helices (see FIG. 5 in this regard) of the two helicoid bodies 2, 3 are constant across the entire axial length of the arrangement of the two helicoid bodies 2, 3. The axial width $b_a$, which is to say the thickness of the helices based on a direction parallel to the shared screw axis of the arrangement of the two helicoid bodies 2, 3, is likewise identical in all helices of the two helicoid bodies 2, 3, and increases with the radial distance from the shared screw axis of the two helicoid bodies 2, 3, apart from the respective rounding at the outer radial edge of the helices.

Figure 4:
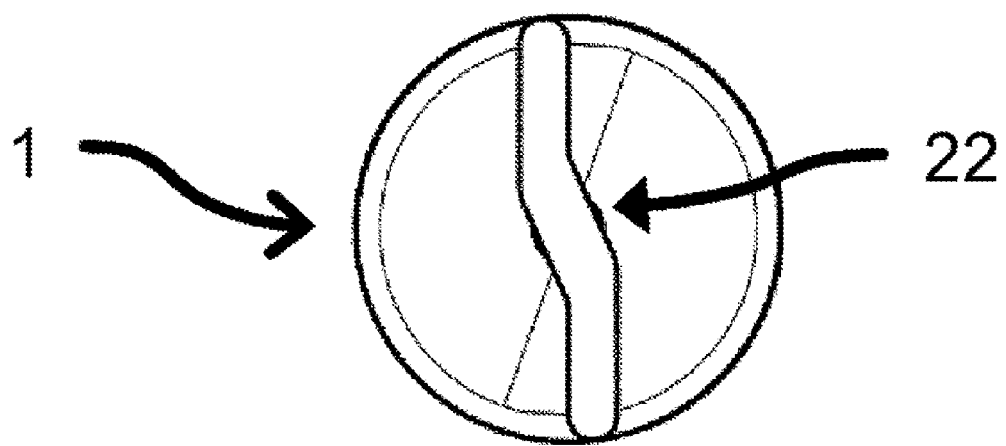
FIG. 4 shows a view from above onto the connecting region of the heating resistor of FIG. 1, with a viewing direction along the longitudinal axis.
Figure 5:
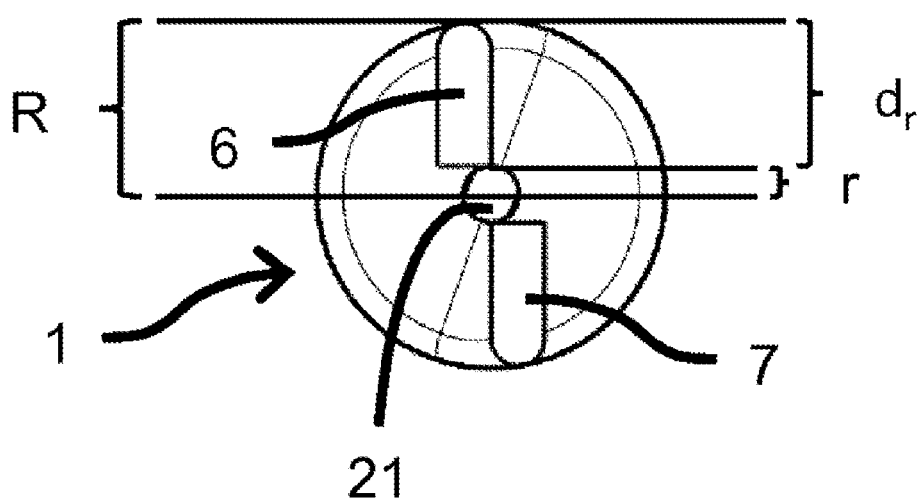
FIG. 5 shows a view from above onto the connecting side of the heating resistor of FIG. 1, with a viewing direction along the longitudinal axis opposite to FIG. 4.

The illustration in FIG. 4 shows the heating resistor 1 of FIG. 1 in a top view onto the longitudinal-side end 5 of the arrangement of the two helicoid bodies 2, 3 including the connecting region 22, and the illustration in FIG. 5 shows the opposite longitudinal-side end 4 including the two separate connecting electrodes 6, 7 as well as the inner radius r and the outer radius R.

Figure 6:
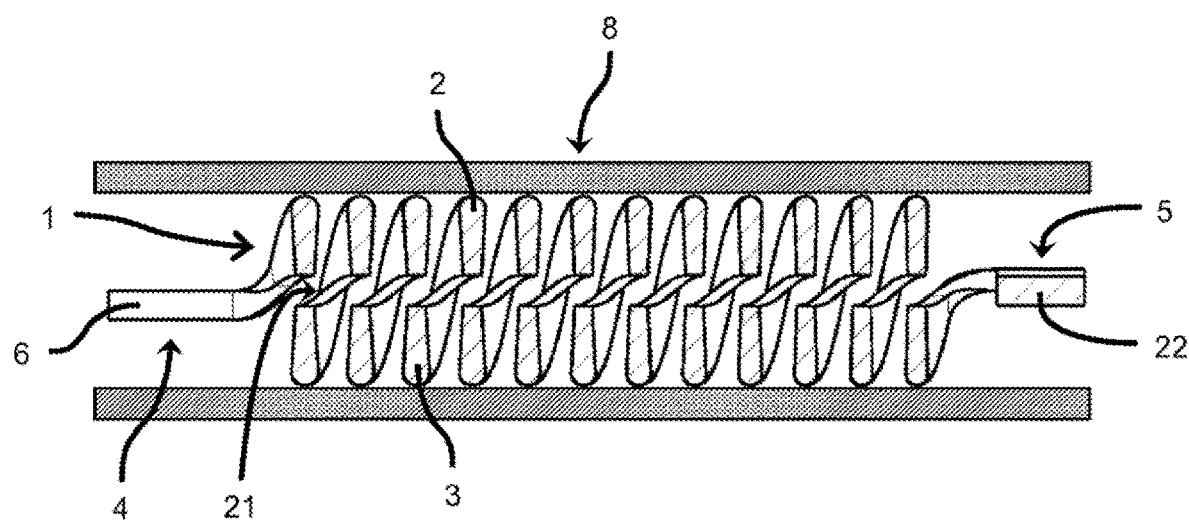
FIG. 6 shows a longitudinal sectional view of a schematic arrangement of the heating resistor in the sectional image according to FIG. 2 in a tubular element.

FIG. 6 shows a schematic longitudinal sectional illustration of the heating coil 1 of FIG. 1 according to the sectional image of FIG. 2 in a tubular element 8 of a heating element.

The tubular element 8 has a hollow-cylindrical design in the exemplary embodiment shown here, and the inner radius of the tubular element 8 is only slightly larger than the outer radius of the arrangement of the two helicoid bodies 2, 3 of the heating resistor 1 disposed in the interior of the tubular element 8. In this way, the heating resistor 1 can be inserted without difficulty into the tubular element, wherein sufficient clearance is still present in the radial direction to compensate for manufacturing tolerances, and additionally it is ensured that the heating resistor and the inner side of the tubular element 8 cannot make contact as a result of thermal expansion during operation of the heating resistor 1. The tubular element 8 is made of a heat-resistant, electrically insulating, ceramic material, preferably a silicate ceramic or an oxide ceramic, such as aluminum oxide.

Figure 7:
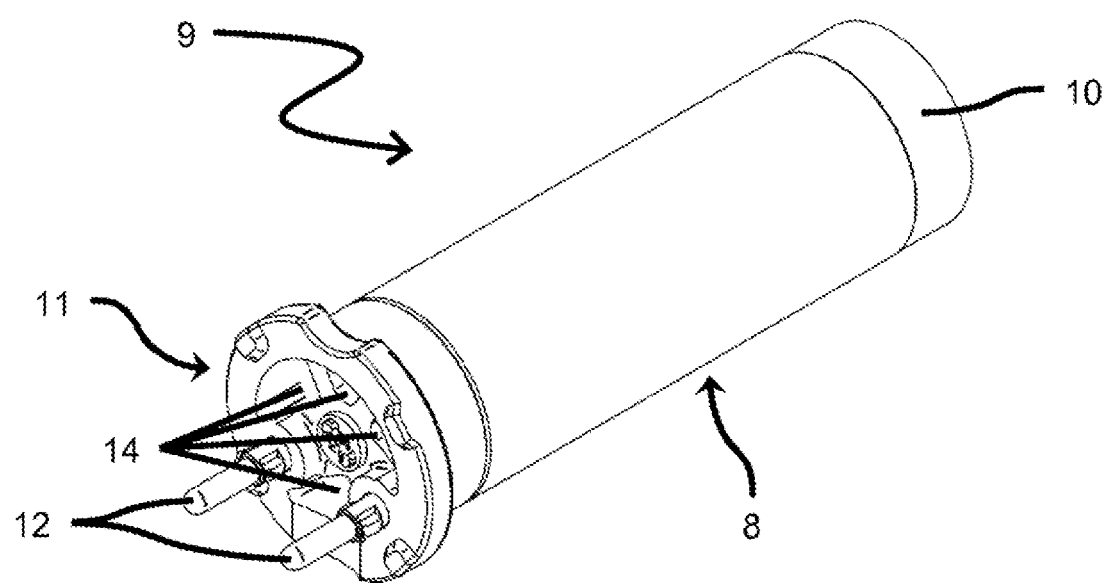
FIG. 7 shows an isometric view of a heating element according to the invention comprising a heating resistor according to the invention (not visible in this view)
Figure 8:
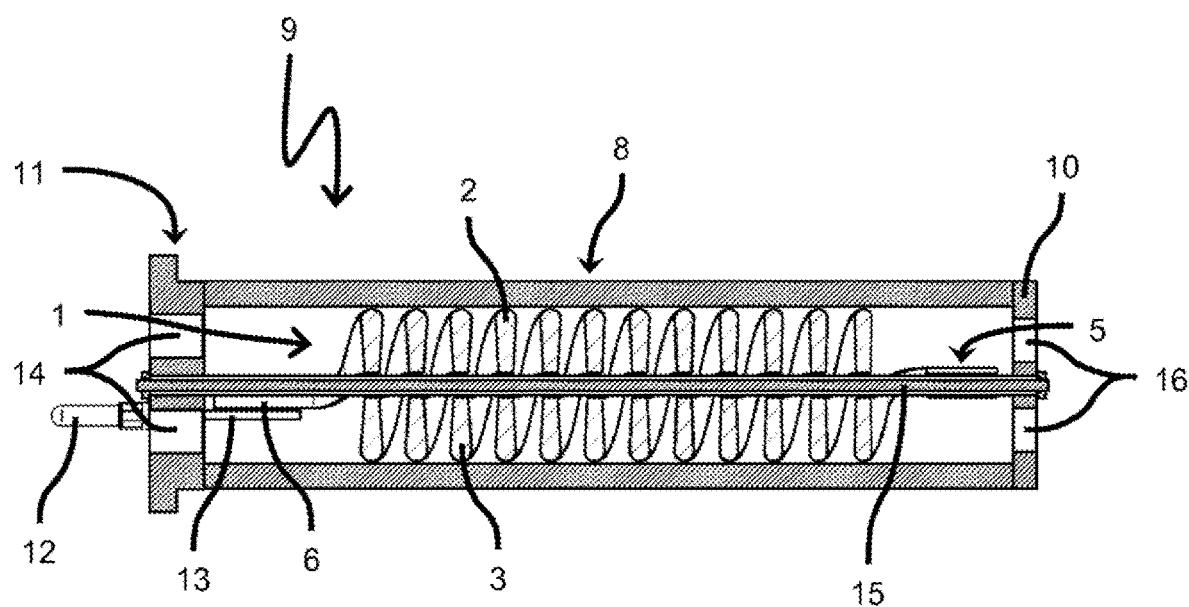
FIG. 8 shows a longitudinal sectional view of a heating element according to the invention according to FIG. 7.

Such a tubular element 8 is an integral part of a heating element 9 shown in the isometric three-dimensional illustration in FIG. 7, wherein the tubular element 8, as in FIG. 6, comprises a heating resistor 1, which is not visible in FIG. 7. FIG. 8 shows a simplified schematic longitudinal sectional view of such a heating element 9 comprising a heating resistor 1 in the interior of the tubular element 8. In addition to a tubular element 8 and a heating resistor 1, the heating element 9 comprises a cover disk 10, a connecting piece 11 and an attachment and clamping means 15 in the form of a rod that extends along the central longitudinal axis of the heating element 9 and is made of an electrically insulating, heat-resistant ceramic material. The connecting piece 11 comprises two outer electrical contacts 12, which in the interior of the heating element 9 respectively transition into one of the two inner electrical contacts 13, wherein each of the inner electrical contacts 13 electrically contacts one of the two connecting electrodes 6, 7 of the heating resistor 1 in the interior of the tubular element 8. The connecting piece 11 moreover includes four cut-outs 14, through which air is able to flow from the exterior space into the interior of the heating element 9, flow around the heating resistor 1 in the tubular element 8, and flow through cut-outs 16 in the cover disk 10 out of the interior of the heating element 9 again. The attachment and clamping means 15 extends both through the entire tubular element 8, and thus also through the heating resistor 1 and through the connecting piece 11 and the cover disk 10. The attachment and clamping means 15 carries the heating element 1 and is implemented with appropriate supports on the outside of the connecting piece 11 and the cover disk 10 so as to brace the entire arrangement made up of the connecting piece 11, the heating resistor 1 and the cover disk 10 in the axial direction. This also serves to limit the thermal expansion of the heating element 1 in the axial direction. In the heating resistor 1 shown in the longitudinal sectional view in FIG. 8, the connecting region 5 of the two helicoid bodies 2, 3 has to be configured differently than in the heating resistor 1 shown in the illustrations in FIG. 1 to FIG. 5, so that the attachment and clamping means 15 can also extend in a rectilinear manner through this region. For this purpose, the heating resistor 1 can, for example, include an appropriate feedthrough for the attachment and clamping means 15 in the connecting region 5.

Figure 9:
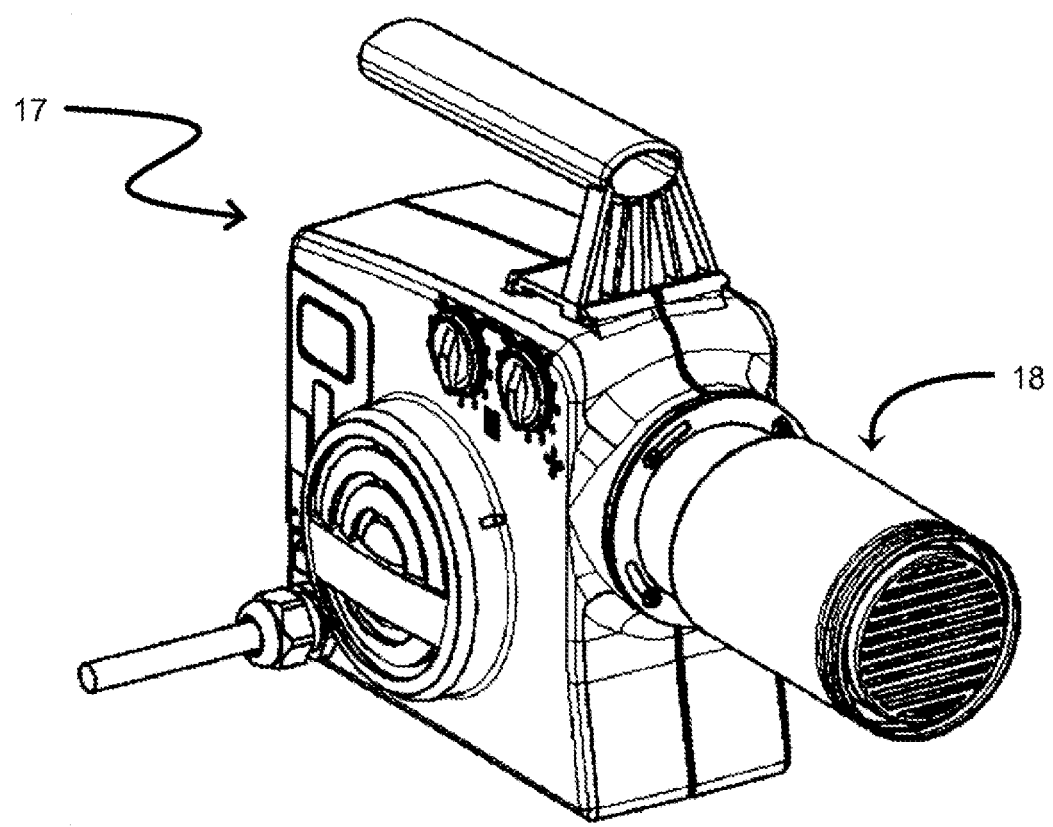
FIG. 9 shows a hot air hand-held device comprising a heating element according to the invention (not visible in this view)

FIG. 9, by way of example, shows a hot air hand-held device 17 as a variant embodiment of a device according to the invention for heating a fluid, and in particular air. In the case of the hot air hand-held device, a heating element according to the invention, such as the heating element 9 shown in the illustrations in FIG. 7 and FIG. 8, is disposed in the heating tube 18.

Figure 10:
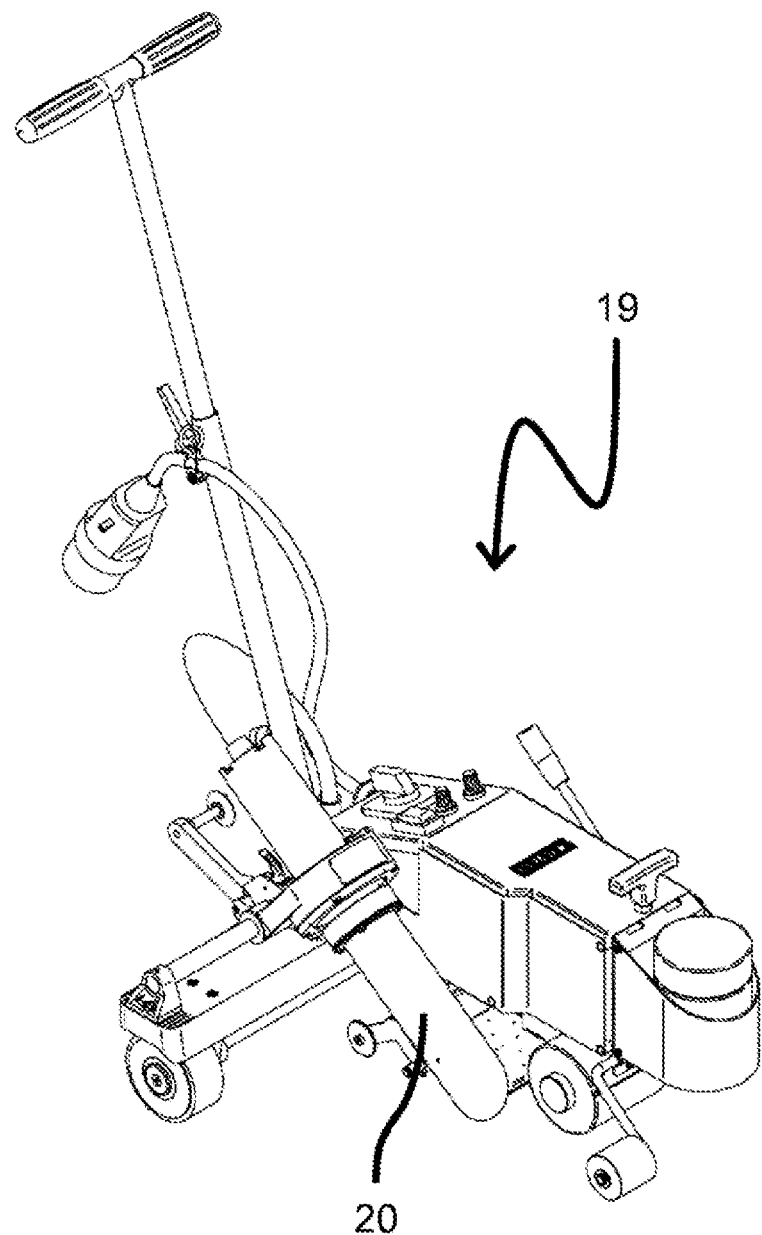
FIG. 10 shows an automatic welding machine for the overlapping welding of planar plastic materials comprising a heating element according to the invention (not visible in this view).

FIG. 10 shows an automatic welding machine 19 for the overlapping welding of planar plastic and/or bitumen sheets as a further example of a variant embodiment of a device according to the invention for heating a fluid, and in particular air, wherein the material layers to be welded together are at least partially plasticized in at least one connecting region by way of a hot air flow. In the case of the automatic welding machine, a heating element according to the invention, such as the heating element 9 shown in the illustrations in FIG. 7 and FIG. 8, is disposed in the heating tube 20.

LIST OF REFERENCE NUMERALS 1 heating resistor
2 first helicoid body
3 second helicoid body
4 first end
5 second end
6 first connecting electrode
7 second connecting electrode
8 tubular element
9 heating element
10 cover disk
11 connecting piece
12 outer contacts
13 inner contacts
14 cut-outs for air to enter
15 attachment means/clamping means
16 cut-outs for air to exit
17 hand-held hot air device
18 heating tube
19 automatic welding machine
20 heating tube
21 central cavity
22 connecting region

The invention claimed is:

1. An electrical heating element for heating a fluid, comprising at least one tubular element through which a fluid flows or can flow, and a ceramic heating resistor disposed in the tubular element, the heating resistor being produced by sintering a green body, comprising at least one ceramic raw material, and comprising an electrically insulating component and an electrically conducting component, and the electrically insulating component forming a matrix in which the electrically conducting component is accommodated, characterized in that the heating resistor comprises an arrangement of two open helicoid bodies having respective central screw axes, the screw axes of the helicoid bodies being collinear with one another and the helicoid bodies being helically wound inside one another in a contactless manner, the central screw axes of the helicoid bodies being oriented substantially parallel to the central axis of the tubular element, the helicoid bodies being connected to one another in an electrically conducting manner in the region of one end of the helicoid arrangement and designed as separate connecting electrodes at an opposing further end of the helicoid arrangement, an electrically insulating element being disposed in at least one central cavity formed by the open helicoid bodies along the screw axes of the open helicoid bodies, the electrically insulating element having a tubular, rod-shaped or sectionally tubular and rod-shaped design, and the tubular element having an inner surface with a shape and size when viewed in transverse cross-section perpendicular to the central axis of the tubular element that is only insignificantly larger than a maximum outer surface of the heating resistor when viewed in transverse cross-section perpendicular to the central screw axes of the helicoid bodies, so as to enable insertion of the heating resistor into the tubular element, and maximize fluid flow through a helical path defined by the helicoid bodies body of the heating resistor, and is such that thermal expansion of the heating resistor during operation does not result in direct contact between the heating resistor and the tubular element.

2. The electrical heating element according to claim 1, wherein the ratio of the radial helix thickness to the axial helix width of at least one helicoid body of the ceramic heating resistor is at least 2:1.

3. The electrical heating element according to claim 1, wherein the ratio of the inside diameter to the outside diameter of at least one helicoid body of the ceramic heating resistor is a maximum of 1:2.

4. The electrical heating element according to claim 1, wherein at least one helicoid body of the ceramic heating resistor has a variable axial helix width.

5. The electrical heating element according to claim 1, wherein at least one helicoid body of the ceramic heating resistor has a variable axial helix width along the screw axis thereof.

6. The electrical heating element according to claim 1, wherein at least one helicoid body of the ceramic heating resistor has a variable distance between adjoining turns along the screw axis thereof.

7. The electrical heating element according to claim 1, wherein the electrically conducting component of the ceramic heating resistor is at least partially formed of a metal alloy of the silicide type.

8. The electrical heating element according to claim 1, wherein the electrically insulating component of the ceramic heating resistor is formed at least of a mineral of the silicate type, a ceramic of the oxide type, and/or an arbitrary combination thereof.

9. A device for heating a fluid, comprising at least one electrical heating element according to claim 1.

10. The electrical heating element according to claim 7, wherein the metal alloy of the silicide type is molybdenum disilicide.

11. The electrical heating element according to claim 8, wherein the electrically insulating component of the ceramic heating resistor is formed at least of feldspar, feldspathoids or other substances forming silicate glass.

12. The electrical heating element according to claim 8, wherein the electrically insulating component of the ceramic heating resistor is formed at least of aluminum oxide.

13. The electrical heating element according to claim 4, wherein at least one helicoid body of the ceramic heating resistor has a radially increasing axial helix width.

* * * * *